March 3, 1959     P. M. CHRISTENSEN     2,876,308
CIRCUIT BREAKERS

Filed Aug. 19, 1953     7 Sheets-Sheet 1

INVENTOR
PAUL M. CHRISTENSEN
BY
ATTORNEYS

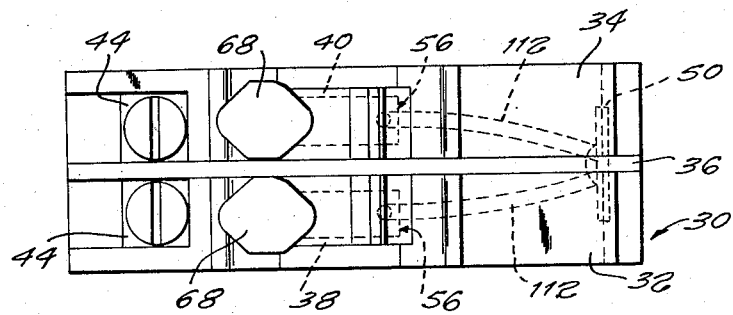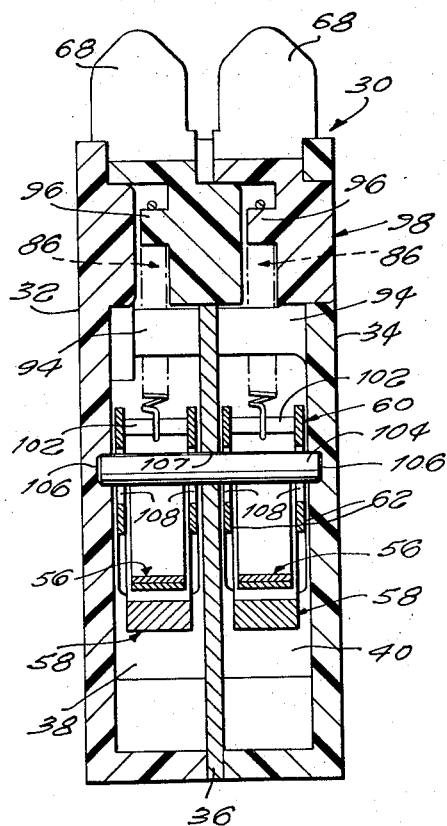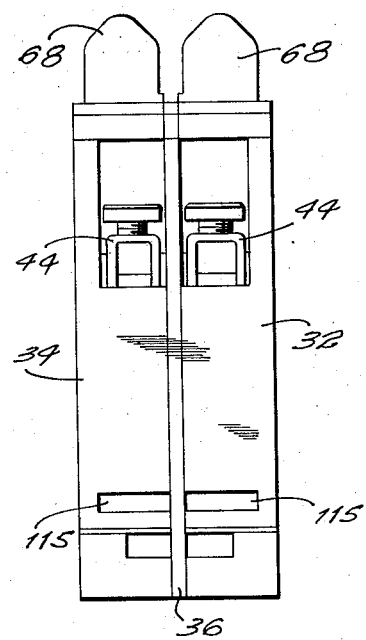

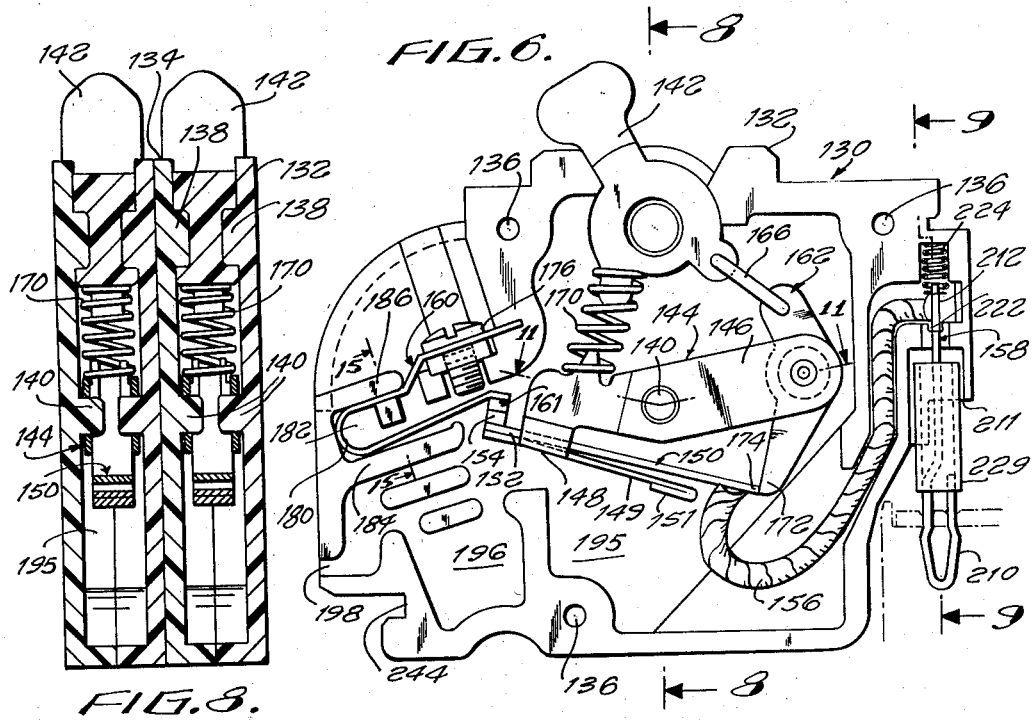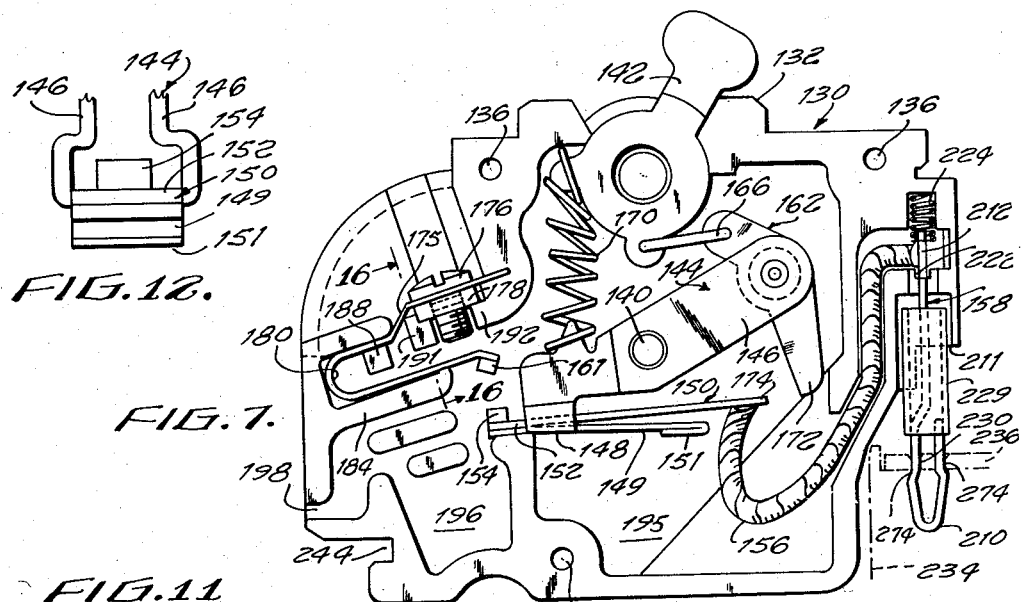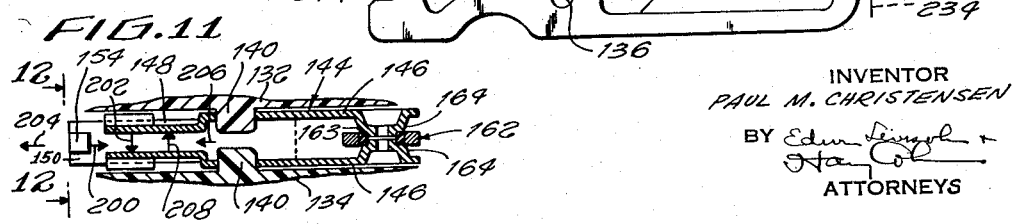

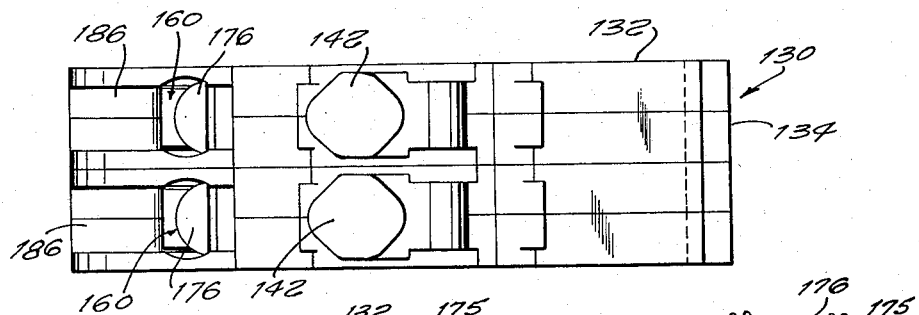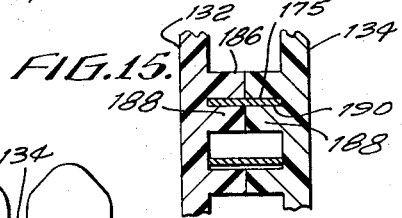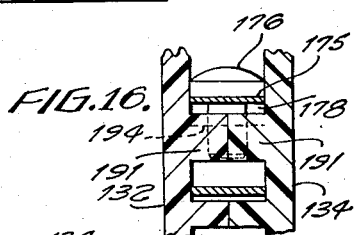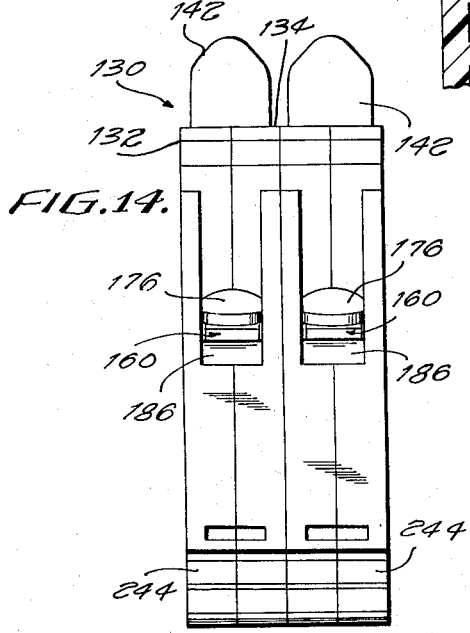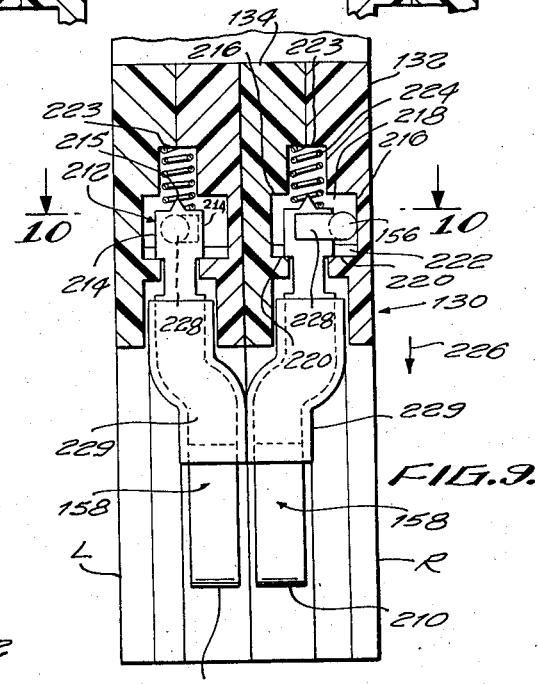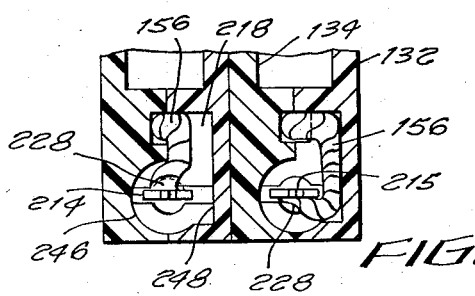

March 3, 1959 P. M. CHRISTENSEN 2,876,308
CIRCUIT BREAKERS
Filed Aug. 19, 1953 7 Sheets-Sheet 5

INVENTOR
PAUL M. CHRISTENSEN
BY
ATTORNEYS

March 3, 1959 P. M. CHRISTENSEN 2,876,308
CIRCUIT BREAKERS
Filed Aug. 19, 1953 7 Sheets-Sheet 6
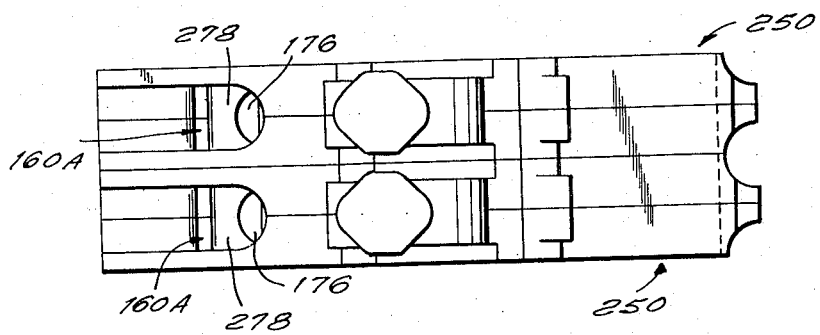
FIG. 20.
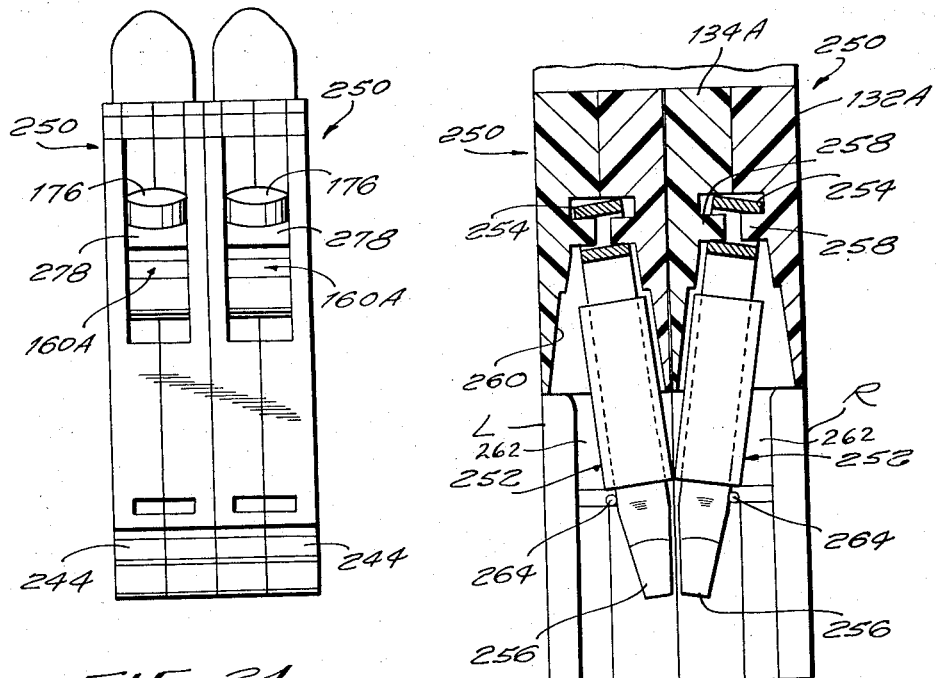
FIG. 19.
FIG. 21.
INVENTOR
PAUL M. CHRISTENSEN
BY
ATTORNEYS March 3, 1959    P. M. CHRISTENSEN    2,876,308
CIRCUIT BREAKERS
Filed Aug. 19, 1953    7 Sheets-Sheet 7
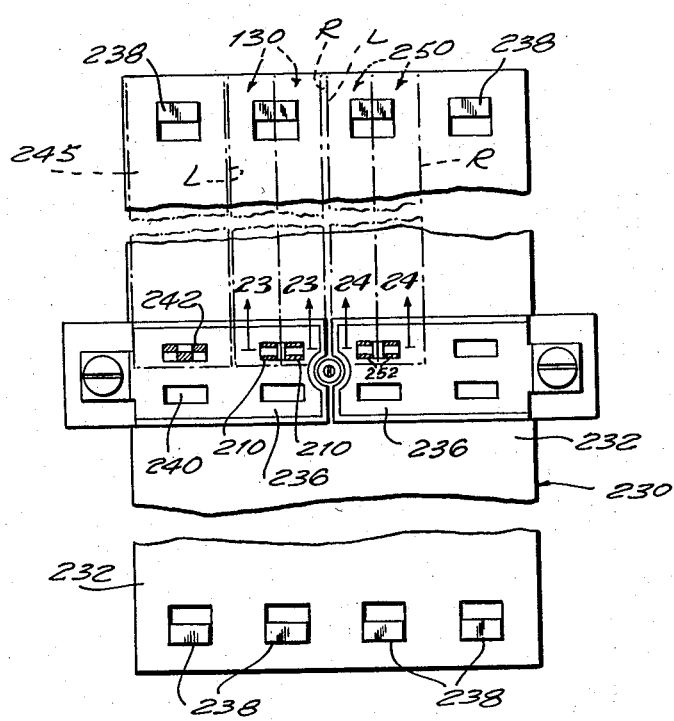
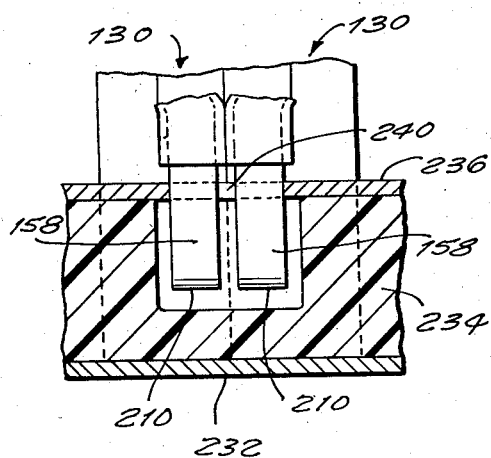
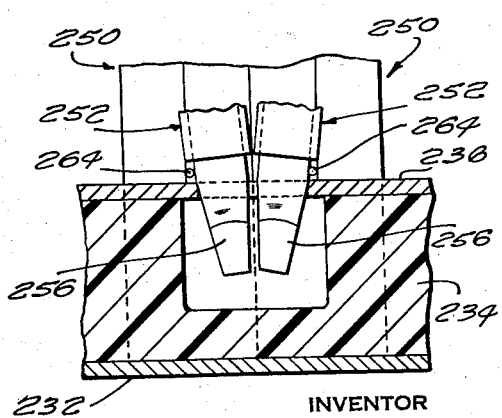
INVENTOR
PAUL M. CHRISTENSEN
BY
ATTORNEYS

United States Patent Office 2,876,308
Patented Mar. 3, 1959

2,876,308

CIRCUIT BREAKERS

Paul M. Christensen, West Orange, N. J., assignor to Federal Electric Products Company, Newark, N. J., a corporation of Delaware Application August 19, 1953, Serial No. 375,114

15 Claims. (Cl. 200—88)

My present invention relates, in general, to automatic circuit breakers of the type shown in Patent No. Re. 23,188 issued on an application filed in the name of Harold A. Humpage, as well as by several pending applications assigned to the assignee of my present application, one or more of which applications will be subsequently referred to as the description proceeds.

The subject application is a continuing application of my prior U. S. applications Ser. No. 137,402, filed January 7, 1950, now Patent No. 2,733,312, dated January 31, 1956, Serial No. 140,800 filed January 27, 1950, now Patent 2,410,048, issued October 15, 1957, and Serial No. 303,886 filed August 12, 1952, now Patent 2,696,540, issued December 7, 1954, all of which are assigned to the assignee of the present invention.

In my U. S. Patent No. 2,599,695, and in the copending U. S. application Serial No. 127,432, filed November 15, 1949, by Thomas M. Cole and myself, now Patent 2,647,225, issued July 28, 1953, both of which are assigned to the assignee of the present invention, there is disclosed panelboard construction for circuit breakers wherein the circuit breakers are securely and removably disposed in side-by-side disposition on the panelboard, by having one end of each circuit breaker casing mechanically releasably locked with a retaining element or holding formation provided on the panelboard. In addition, provision is made for a prong or stab type terminal at the other end of each circuit breaker casing which releasably engages in a terminal slot provided in a bus bar mounted on the panelboard, said prong terminal both electrically engaging and mechanically releasably locking the circuit breaker in the terminal slot of the panelboard. Each retaining element and its cooperating terminal slot are aligned in paired relation on the panelboard to provide a pair of spaced cooperating retaining means between which each circuit breaker is disposed. In order to mount a plurality of circuit breakers in side-by-side disposition on the panelboard, the pairs of retaining means are relatively displaced in a row to accommodate circuit breaker casings of predetermined width, said casings, as now constructed, being substantially one inch wide. In my previously mentioned copending application Serial No. 303,886, provision was made for substantially increasing the circuit breaker capacity of such a panelboard without increasing the number of pairs of retaining means, and without in any manner altering the panelboard, through the provision of a common housing for a pair of independently operable circuit breaker mechanisms provided with a common stab or prong terminal for engagement in the terminal slot on the panelboard, the common housing being of the same width as the individual housings which contain single circuit breaker mechanisms.

The primary object of the present invention is the provision of means to substantially increase the circuit breaker capacity of such a panelboard without increasing the number of pairs of retaining means, without in any manner altering the panelboard, and without the necessity of providing a common housing and a common terminal for a pair of independently operable circuit breaker mechanisms.

In connection with the foregoing object, it is another object to provide a circuit breaker which is provided with a prong or stab type terminal mounted for movement relative to its circuit breaker casing, whereby a terminal slot adapted to accommodate the prong or stab terminal provided in a casing of predetermined widthwise dimension can accommodate a pair of prong or stab terminals each provided in a circuit breaker casing which is substantially one-half the width of said circuit breaker casing of predetermined widthwise dimension. In this connection, a more specific object is to provide a stab terminal member which is mounted for lateral movement transversely of its circuit casing. Another specific object in this connection is the provision of a stab terminal member which is mounted for rotary movement in its circuit breaker casing, whereby to dispose the connecting portion of the latter in alternate positions thereof, which positions are displaced by substantially 180 degrees.

Another object is the provision of a generally improved movable switch member assembly for an automatic circuit breaker, which assembly includes latching means constituted by a thermally responsive control device provided with a movable contact and an armature member provided on the movable switch member and mounting the thermally responsive control.

Another object is the provision in an automatic circuit breaker of a coiled type tension spring which is operable (1) to bias the movable switch member to open circuit position and to move the movable switch member quickly to open circuit position when the actuator is unlatched pursuant to the operation of the current-responsive latch device, (2) to resiliently oppose movement of the movable switch member from circuit-open position to circuit-closed position, (3) to resiliently hold the handle in the "on" position thereof when the circuit breaker is closed and to move the handle to its "off" position when the circuit breaker is tripped, and (4) to bias the movable switch member to resiliently press the movable contact which is bodily movable therewith against the stationary contact for proper contact pressure when the circuit breaker is closed.

A further object is the provision of a movable switch member which functions as an arc blow-out device.

A still further object is the provision of a generally improved casing construction for an automatic circuit breaker, which casing is provided with insulation barrier means interposed between the engaged contacts and the movable switch member to prevent the latter from being subjected to the arcs or to gases produced thereby and which also has provision for mounting a resiliently mounted stationary contact.

The above and other objects, features and advantages of the present invention will be more fully understood from the following description considered in connection with the accompanying illustrative drawings.

In the drawings:

Fig. 3 is a sectional view taken on the line 3—3 of Fig. 1;

Fig. 4 is a top plan view of the circuit breaker;

Fig. 5 is an end view of the circuit breaker;

Figs. 6 and 7 are views similar to Figs. 1 and 2, respectively, of a unitary circuit breaker and illustrate another embodiment of the present invention;

Fig. 8 is a sectional view taken on the line 8—8 of Fig. 6, through a pair of circuit breakers;

Fig. 9 is a sectional view taken on the line 9—9 of Fig. 6, through a pair of circuit breakers;

Fig. 10 is a fragmentary sectional view taken on the line 10—10 of Fig. 9;

Fig. 11 is a fragmentary sectional view taken on the line 11—11 of Fig. 6;

Fig. 12 is a fragmentary view taken on the line 12—12 of Fig. 11;

Fig. 13 is a top plan view of a pair of the circuit breakers illustrated in Fig. 6;

Fig. 14 is an end view of a pair of the circuit breakers illustrated in Fig. 6;

Fig. 15 is a fragmentary sectional view taken on the line 15—15 of Fig. 6;

Fig. 16 is a fragmentary sectional view taken on the line 16—16 of Fig. 7;

Fig. 19 is a sectional view through a pair of circuit breakers taken on the line 19—19 of Fig. 17;

Fig. 20 is a top plan view of a pair of the circuit breakers illustrated in Fig. 17;

Fig. 21 is an end view of a pair of the circuit breakers illustrated in Fig. 17;

Fig. 22 is a plan view of a circuit breaker panelboard with circuit breakers, illustrated in phantom, in position on said panelboard, and the prong terminals thereof being illustrated in section at the level of the conducting strap or bus bar of the panelboard;

Fig. 23 is a fragmentary sectional view, on an enlarged scale, taken on the line 23—23 of Fig. 22; and Fig. 24 is a fragmentary sectional view, on an enlarged scale, taken on the line 24—24 of Fig. 22.

Figure 1:
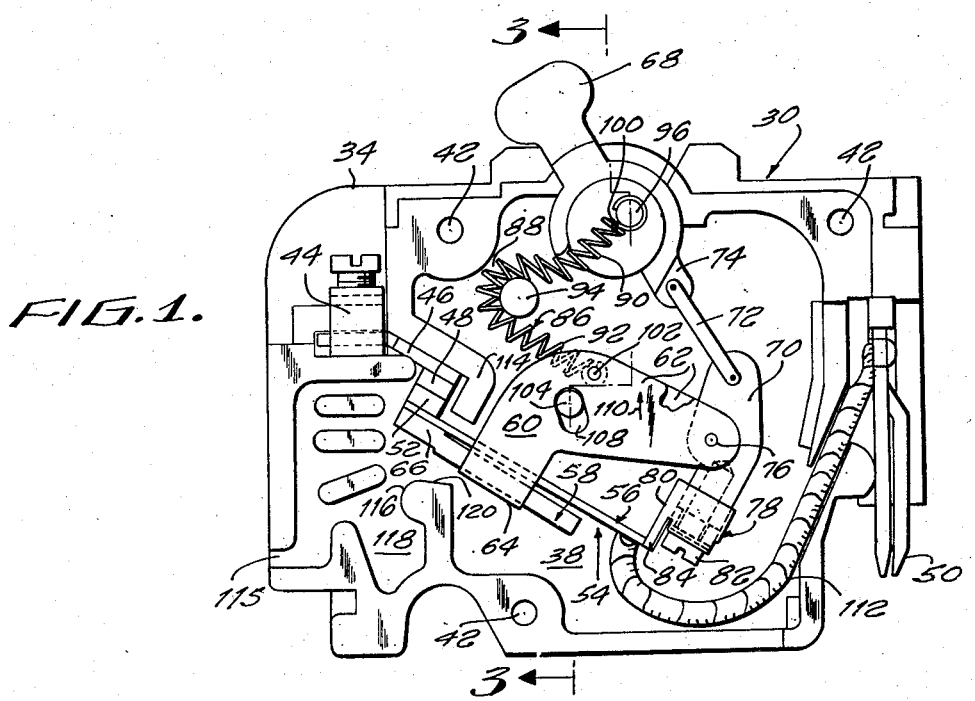
Fig. 1 is a side view of a duplex circuit breaker pursuant to the present invention, one of the casing parts being removed and the circuit breaker mechanism being illustrated in the closed or circuit making condition thereof.

Referring now to Figs. 1–5 of the drawings in detail, there is illustrated a duplex circuit breaker 30 which comprises a two part insulation casing having the complementary molded parts 32 and 34 which are separated by an insulated partition member 36 so as to define the separate chambers 38 and 40 (Fig. 3) in each of which there is disposed an independently operable circuit breaker mechanism. It will be understood that the two casing parts and the partition member are held together by bolts or other suitable means passing through openings 42 in the casing part 34, and similar openings both in the casing part 32 and in the partition 36 which register with the said openings 42 when the two casing parts and the partition member are in assembled relation. Each casing part mounts a suitable branch terminal 44 for the associated circuit breaker mechanism and each terminal is provided with an extending terminal element 46 which rigidly mounts a stationary contact 48. The circuit breaker 30 is provided with a single line terminal member 50 for both circuit breaker mechanisms. Said terminal is suitably connected to each of the separate circuit breaker mechanisms, in the chambers 38 and 40, respectively, as hereinafter described in detail. While as here shown, the member 50 is preferably in the form of a prong or stab of the plug-in type, it will be understood that this is not essential to the present invention, but on the contrary another type of terminal member can be provided instead.

Figure 2:
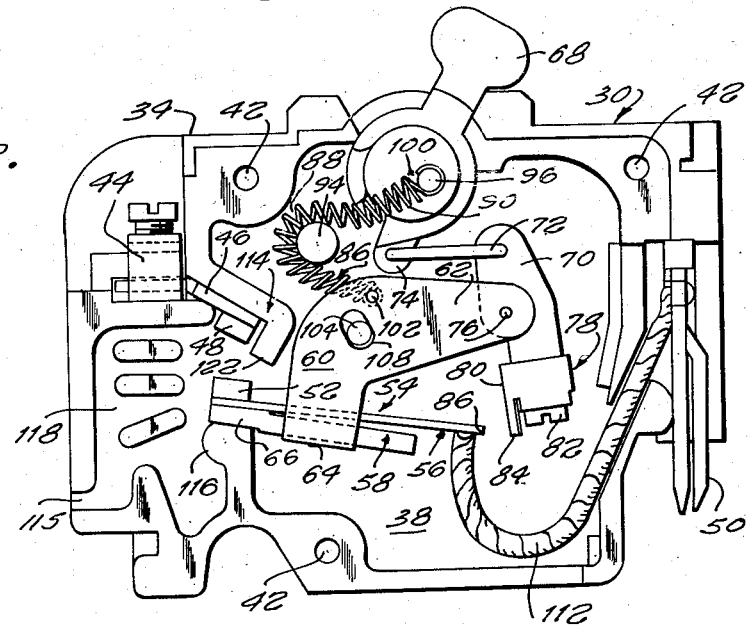
Fig. 2 is a view similar to Fig. 1 with the circuit breaker mechanism in the circuit interrupting or open position thereof.

The stationary contact 48 is disposed on its support 46 in a position within each casing chamber to be engaged by a companion movable contact 52 which is carried by the current-responsive latch means 54, which means is constituted by a flexible bimetallic current-responsive latch element 56 and a companion rigid armature 58. Pursuant to one feature of the present invention, the latch element 56 is not secured directly to the movable switch member 60 but said latch element is secured, at the end thereof which is provided with the movable contact 52, to the rigid armature member 58 which, in turn, is carried by the movable switch member 60. As best illustrated in Fig. 3, the movable switch member 60 is constituted by the opposing upstanding arms 62—62 which are generally in the shape of a bell crank lever, as best illustrated in Figs. 1 and 2, and which are interconnected at one end thereof by the integral base portion 64 so as to be substantially U-shaped in cross section. The member 58 is formed of magnetic material and is secured in face-to-face disposition on the cross part or base 64 in a suitable manner, for example and not by way of limitation, by being spot welded thereto. At the projecting end portion 66 thereof, the magnetic member 58 mounts the flexible bimetallic strip 56 which is suitably secured thereto, as by welding, whereby said end portion 66 serves as a rigid backing and mechanical support for the portion of the flexible strip 56 which carries the movable contact 52, it being noted that the major portion of the flexible strip is spaced from the rigid armature 58. Due to the underlying mechanical support and rigid backing provided by the portion 66 of the armature for the contact carrying end of the bimetallic strip 56, it will be apparent that the movable contact 52 is rigidly mounted relative to the movable switch member 60.

Each movable switch member 60 is mounted for pivotal movement between the adjacent casing parts 32, or 34, as the case may be, and the partition member 36, to and from the circuit closed position thereof illustrated in Fig. 1, in which contact 52 engages the stationary contact 48, and to and from the circuit-open position illustrated in Fig. 2, in which said movable contact 52 is shown disengaged from said stationary contact 48. This movement may be accomplished manually for each member 60 by its associated handle 68 which is connected to a companion actuator or lever 70 by a link 72. Said link is pivotally connected at one end thereof to an extending lug portion 74 provided on the handle and at its opposite end to the actuator 70. The actuator is pivotally mounted between the arms 62—62 of the movable member 60 by means of a pivot 76 which extends between said arms. The actuator is also provided, at the end thereof remote from the link 72, with a calibration device 78. Said device operatively connects the actuator to the movable member 60, under the control of the current-responsive bimetallic strip 56, by which said actuator 70 is releasably latched to the movable member 60, as described in the above-mentioned Patent Re. 23,188. In this connection, it will be noted that the calibration device 78 includes a collar 80 which is adjustably mounted by means of the screw 82 on the actuator 70, said collar having a latching portion 84 for releasable engagement with the free marginal edge 86 of the bimetallic 56.

It will be understood that, as illustrated in Fig. 1, when the handle 68 is in the "on" or circuit closed position thereof, and the actuator 70 is latched to the movable switch member 60 by engagement with the outer edge 86 of the bimetallic strip, as shown, relative pivotal movement between the actuator and the movable switch member is prevented and contact 52 is in engagement with contact 48. In this position, the link 72, which may be a rigid link pursuant to the present invention, and the actuator 70 are in overset toggle condition, and in order for each circuit breaker mechanism to open automatically pursuant to the flexing of the bimetallic strip upon heating thereof, the toggle must be broken, and this can take place by movement of the handle 68 to its circuit open position (Fig. 2) either manually or by release of the latch part 84 of the calibration device 78 by the bimetallic strip 56 when the circuit breaker trips upon overload or other predetermined load conditions. The opening of the circuit breaker when the strip 56 releases the latch element 84 is effected by the spring 86. Pursuant to a feature of the present invention, said spring is of the coil or spiral type and is bent to provide the central arcuate portion 88 and the opposing arms or end portions 90 and 92. It will be noted that each of the casing parts 32 and 34, respectively, is provided with a laterally extending projection or boss 94 which mounts the arcuate portion 88 of the companion spring 86 in position in the casing.

The spring portion 90 is connected to the handle part 96, as best illustrated in Fig. 3, which part extends from the pivot portion 98 of the handle, and is offset from the center of said pivot portion, which center is indicated at 100 in Figs. 1 and 2. The spring portion 92 is connected to a pin 102 which is carried by the spaced arms 62 of the movable member 60 between the pivot 104 of the movable switch member and the end portion thereof on which the actuator 70 is pivotally mounted. It will be noted that the pivot 104 mounts both of the movable switch members 60 and is supported in bearings 106 provided in the casing parts 32 and 34, respectively, and has bearing support in the partition member 36, as at 107. It will be noted from Fig. 1 that a line drawn between the center of the handle part 96, to which the spring portion 90 is connected, and the pin 102, to which the spring portion 92 is connected, would lie in a direction to the right of the point 100 which, as previously indicated, is at the center of the pivot portion 98 of the handle 68. It will be further observed that the spring 86 is under tension and when connected as illustrated in Figs. 1 and 2, will bias the movable switch member 60 to the open circuit position thereof and will move the latter to said position when the bimetallic strip 56 disengages the latch element 84. Also, it will be noted that the spring 86 is effective to move the handle to its "off" or circuit open position when the circuit breaker is tripped, that is when the movable member 60 moves to a circuit open position pursuant to the release of the latch element 84 by the strip 56. Further, it will be observed that even though the handle 68 is held in "on" position, said spring is effective to open the circuit breaker when the latter is tripped, that is, when the strip 56 disengages the latch element 84.

There is provision of means for bodily moving the movable switch member 60 relative to its pivot 104 in conjunction with the spring 86 for permitting a limited bodily movement of the movable switch member and for biasing the movable contact 52 toward the stationary contact 48, in the closed circuit position of said movable member 60 in order to provide the proper pressure between said contacts when they are engaged, or to compensate for wear or other inequalities in the various cooperating parts of the circuit breaker. For this purpose, the movable member 60 is provided, in each arm 62 thereof, with an elongated closed slot 108 through which the pivot 104 extends. It will be observed that in the closed condition of the circuit breaker mechanism, as illustrated in Fig. 1, i. e., with the link 72 and the actuator 70 in overset toggle condition, the spring 86 being in tension, the switch member 60 will be urged by said spring in the direction of the arrow 110 in Fig. 1, whereby to pivot about the pivot pin 76 of the actuator 70, in a direction to resiliently press the movable contact 52 against the stationary contact 48, the slot 108 permitting for the necessary bodily movement of the switch member relative to the pivot 104. In this connection, it will be understood further that while spring 86 is thus effective in this manner to press the contact 52 against the contact 48, it is also potentially effective to move the movable switch member 60 in a counterclockwise direction about the pivot 104 to circuit opening position the instant that the strip 56 operates to disengage or release the latch 84 carried by the actuator 70. More specifically, it will be understood that upon said release of the latch element 84, the toggle constituted by the handle 68 and the link 72 will collapse, as illustrated in Fig. 2, and the spring 86 will thereupon be effective to bodily move the movable member 60 in an upward direction until the bottom of the slot 108 engages the pivot 104 whereupon said spring is effective to pivot the movable switch member about its pivot to the position thereof illustrated in Fig. 2. It will be noted from Fig. 1 that there is a clearance between the upper end of the slot 108 and the pivot 104 in the closed condition of the circuit breaker, to allow for the closing operation of the circuit breaker mechanism without said upper end hitting said pivot when said mechanism is moved from the open condition thereof illustrated in Fig. 2 to said closed condition thereof.

The strip 56 is operable not only in response to the heating effect of the current passing therethrough, it being noted that the circuit through the breaker from the terminal 44 to the terminal 50 is completed by the flexible conductor 112 between the terminal 50 and the strip 56, but is also operable under the control of the electro magnetic armature 58 which is energized by the current which passes through the strip 56. Upon the occurrence of an overload in excess of that for which the circuit breaker is designed to open under the control of the thermal element 56 by flexing of the latter in response to the heating thereof, the electro magnetic armature 58 is operable instantaneously to effect disengagement of the companion contact members. In this connection it will be understood that upon the occurrence of such excess overload the magnetic attraction between the armature 58 and the bimetallic strip 56 results in the deflection of the strip for disengaging the latter from the latching element 84, it being understood that since the armature 58 is rigid and the strip 56 is flexible, the strip is movable by magnetic attraction toward the armature, thus resulting in the deflection thereof to unlatch the latching element 84 therefrom. It will be noted from Fig. 4, that the single prong terminal member 50 is common to each of the circuit breaker mechanisms in the chambers 38 and 40 respectively since it is connected to one end of each of the flexible conductors 112, the other ends of which are connected to the separate latching strips 56.

Pursuant to another feature of the subject invention, it will be noted that provision is made in the casing for separating each mechanism containing chamber from the chamber in which the companion contacts are disposed. More specifically, referring now to Figs. 1 and 2, and as illustrated in connection with the casing part 34, it will be noted that said latter part is provided with the wall portions 114 and 116 which together form a wall which separates the mechanism containing chamber 38 from an arcing chamber 118 in which the companion contacts are disposed, said wall having an opening 120 through which the armature 58 and the bimetal 56 extend for disposing the movable contact 52 in the arcing chamber 118. It will be understood that the partition member 36 abuts the wall portions 114 and 116 to enclose the chambers 38 and 118. It will be noted that no portion of the movable member 60 extends into the arcing chamber 118 in either the open or closed condition of the circuit breaker. In addition, it will be noted that the wall portion 114 is provided with the end part 122 which defines opening 120 and which is interposed between the stationary contact 48 and the movable member 60. Said wall part constitutes an arc barrier which prevents the movable switch member 60 and the other mechanism in chamber 38 or 40, as the case may be, from being subjected to arcs or hot gases generated upon disengagement of the contacts, said arcs and gases being deflected thereby back into the arcing chamber 118 which is vented, as at 115.

While the various features of the coiled tension spring 86, the movable switch assembly 60 and the insulation barrier 122 of the present embodiment have been described in connection with a duplex circuit breaker arrangement, it will be understood that these features of the invention are not limited to a duplex circuit breaker and that it is within the scope of the present invention to provide these various features in individual circuit breaker units.

Referring now to Figs. 6–16 in detail, there is illustrated another embodiment of the present invention. In the present embodiment, the circuit breakers 130 are each individual units, i. e. each circuit breaker mechanism is provided in its individual casing which, as here shown, is constituted by the companion insulated casing parts 132 and 134 which are secured together in housing defining relation by suitable securing elements disposed within the securing apertures 136 in each of the casing parts, said securing apertures being illustrated herein in the casing part 132, and it being understood that similar apertures are provided in the casing part in 134 which are aligned with the apertures in casing part 132. The casing parts are provided with cooperating portions 138 and 140, respectively, the former serving as pivot bearings for the handle 142 and the latter serving as pivot bearings for the movable switch member 144, as best illustrated in Fig. 8 which represents a sectional view taken through a pair of circuit breakers 130 disposed in side-by-side relation. The switch member 144 is constituted by laterally spaced arms or portions 146 which are interconnected at one end thereof by a base or bight portion 148. Pursuant to a feature of the present invention, a rigid armature 149 is formed integral with the movable switch member 144 and more specifically is constituted by integral laterally extending portions of the base part 148. It will be understood that the switch member 144, and consequently the armature 148 thereof, is formed of magnetic material. A flexible bimetallic strip 150 is secured at one end 152 thereof in face-to-face disposition with the armature 148, as by being welded thereto. The thermal element 150 is provided at the end 152 thereof with a contact 154 and at the other end thereof is connected to a flexible conductor 156 which is also connected to a stab or prong terminal 158, hereinafter described in detail. In order to complete the circuit through the breaker, provision is made for a load or branch terminal 160 which is provided with a stationary contact 161 disposed thereby within the circuit breaker casing for engagement by the companion movable contact 154. In order to effect manual operation of the circuit breaker to open and close the latter, the movable switch member 144 pivotally mounts an actuator 162. More specifically, the arms 146 of the movable switch member are provided with the confronting pressed in portions 164 which constitute pivot bearings for the actuator 162, as best illustrated in Fig. 11, the latter having an insulation bushing 163. A link 166 interconnects the handle 142 and the actuator 162, said link being pivotally connected at opposite ends respectively thereof to the handle and the actuator. It will be understood that the mechanism constituted by the handle 142, movable switch member 146, the movable contact 154, the thermal strip 150, the actuator 162 and the link 166 is similar to and operates substantially in the same way as corresponding mechanism in the previously identified United States Patent No. Re. 23,188.

A compression coil spring 170 interposed between the movable switch member 144 and the handle 142 operates to bias the movable switch member and the handle to open circuit position, as in Fig. 7, from the closed position thereof illustrated in Fig. 6. It will be understood therefore that automatic tripping of the circuit breaker is effected by the spring 170 upon release of the latching end 172 of the actuator by the end 174 of the thermal strip 150 upon deflection of the latter in response to overload or other abnormal circuit conditions. However, the thermal current responsive member 150 is operable not only in response to the heating effect of the current passing through it but also operates in response to the magnetic action of the armature 149, in substantially the same manner as described in the above-identified Patent No. Re. 23,188. In this connection it will be understood that the armature 149 is a substantially rigid member and the bimetal 150 is flexible, as previously indicated. Therefore, it will be understood that when excess current flows through the strip 150, the magnetic attraction between the armature 149 and the strip 150 results in the deflection of the strip to disengage the latter from the actuator, the flexible strip moving toward the rigid armature 149 to effect the unlatching of the strip from the actuator for tripping the circuit breaker. In order to increase and concentrate the magnetic flux near the end 174 of strip 150, the armature is bent back or thickened, as at 151, to facilitate the magnetic tripping action.

In the present embodiment, the link 166 is substantially a rigid element and in order to provide for the required contact pressure, the terminal 160 has provision to resiliently mount the stationary contact 161. More specifically, the terminal 160 is constituted by a flat spring member 175 provided at one end with the stationary contact 161 disposed thereby within the circuit breaker casing and provided at the other end with the wire attaching or securing screw 176 which threads within a companion nut 178 suitably mounted within the circuit breaker casing, the spring being shaped as best illustrated in Figs. 6 and 7. It will be noted that the spring 175 is provided with a fulcrum portion 180 which is disposed within a seat 182 defined by the thickened wall portions 184 and 186 of the casing. In order to securely releasably retain the spring fulcrum within the seat 182, the casing parts are provided with the confronting thickened portions or projections 188 which define with the wall portions 186, a slot 190 for the spring as best illustrated in Fig. 15. The companion casing parts are also provided with the thickened portions 191 and 192 which define a seat 194, as best illustrated in Fig. 16, in which the nut 178 is disposed and retained against rotation relative to the screw 176. It will be noted from a comparison of Figs. 6 and 7 that the spring 175 is compressed in the closed condition of the circuit breaker to provide the required contact pressure upon engagement of the companion contacts 161 and 154. Wall portions 186, 188, 191 and 192 in a sense make up a slot which laterally receives member 175 during assembly of the circuit breaker and thereafter fixes the external terminal end portion of the resilient U-shaped member 175; and wall portion 184 similarly receives member 175 when it is laterally being inserted and this latter wall portion 184 has the further function (see Fig. 7) of limiting the travel of contact 161 away from the external terminal and in the direction of the companion contact 154 when the latter moves to its circuit-breaker-open position.

Pursuant to another feature of the present embodiment, the switch member 144 itself constitutes an arc blowout device to direct arcs which may be generated between the companion contacts in a direction away from the casing chamber 195 in which the circuit breaker mechanism is disposed, and through the arcing chamber 196 to the vent 198 which permits the gases generated by the arc to flow out of the casing. More specifically, as previously indicated, since the armature 148 is integral with the switch member 144, the switch member is formed also of magnetizeable material.

Referring now to Fig. 11, assuming a current flow through the bimetallic strip 150 in the direction of the arrow 200, a magnetic field will be established in the movable switch member 144 and the lines of flux thereof will be in the direction of the arrow 202 across the arms 146 thereof between which the strip 150 is disposed. In addition, a magnetic field will be generated about the strip 150 through which the current flows, and the interaction of said fields will provide a resultant increased magnetic field in the direction of the arrow 204 which will tend to blow the arcs away from the chamber 195 and into the chamber 196. In the same manner, current flow through the bimetallic strip 150 in the direction of the arrow 206 will provide a magnetic field between the arms of the movable switch member, the lines of flux of which will be in the direction of the arrow 208. The consequent magnetic field established about the strip 150 will interact with the magnetic lines of flux 208 and again result in a magnified or resultant magnetic field in the direction of the arrow 204 to provide a magnetic arc blow-out in the direction of the arrow 204. It will be understood that this magnetic blow-out action operates in substantially the same manner as in my prior copending application Serial No. 137,402 wherein magnetic horns are provided on a uniplanar movable switch member.

Pursuant to a feature of the present invention, the terminal stab or prong member 158 is mounted within the circuit breaker casing for movement relative thereto. More specifically, the terminal 158 is constituted by a strip of conducting material, which has a required degree of inherent resiliency, and which is bent upon itself to form the looped end contact portion 210 which projects from the casing, as at 211, and the opposite end portion 212 which is mounted within the casing. Said portion 212, as best shown in Fig. 9, is provided with the laterally extending ears or tabs 214 and with the projecting spring retaining portion 215. In order to mount the stab 158 in position within the casing, the companion casing parts are provided with the complementary recessed wall portions 216 which define a chamber or recess 218 in which the upper end 212 of the stab is mounted, said portions also defining shoulders 220 for engagement by the tabs 214 and the groove or seat 222 into which the tabs extend, said shoulders being at the bottom of the seat. In order to properly seat the tabs within the groove 222 and in abutment with the shoulders 220, provision is made for a compression spring 224 one end of which abuts the adjacent portion 223 of the casing recess and the other end of which is seated on the stab end 212 being retained thereon by the portion 215. It will be understood that the spring 224 biases the stab contact 158 in the direction of the arrow 226 to properly seat the end 212 within the seat 222. It will be noted that the previously mentioned flexible conductor 156 is connected to the stab end 212 as at 228 and that the stab is provided with an insulation sleeve 229 above its contact end 210.

Referring now to Figs. 22 and 23 in detail, there is illustrated a circuit breaker panelboard 230 which is of the type illustrated and described in my previously identified Patent No. 2,599,695, and in the previously referred to application Serial No. 127,432 filed by Thomas M. Cole and myself. As illustrated and described in detail in said patent and in said application, and as herein shown, the panelboard 230 is provided with a mounting pan 232 which carries an insulated base 234 which is provided on its upper surface with the bus bars or conducting straps 236. In order to accommodate circuit breakers in a row in side-by-side disposition at each side of the bus bars, as illustrated in Fig. 2 of said patent and in Fig. 1 of said application, the panel is provided with mechanical retaining elements 238 each of which is aligned or paired with a companion terminal slot 240 provided in the bus bar. As presently constructed, said slots are dimensioned so that each one accommodates a prong member of the type illustrated in Fig. 6 in said application and shown herein at 50 in Figs. 1 and 2 and in section at 242 in Fig. 22. It will be noted that said prongs engage all four edges of the slot 240, as described in said latter application, and are provided in casings which are illustrated herein in phantom at 245, which casings are substantially wider than the slots 240. The casings are secured in position on the panel 232 by engagement of a hook 238 in a casing recess, as best illustrated in Fig. 4 of said copending application. Pursuant to a feature of the present invention, the circuit breaker capacity of the panelboard 230 may be increased without altering the latter in any respect whatsoever. More specifically, provision is made pursuant to the present invention, to mount two individual circuit breakers 130 in the space occupied by each circuit breaker 245, so that each hook retainer 238 and a companion slot 240 will cooperate to releasably secure in position on the panelboard, two separate circuit breakers which will be electrically connected to the bus bar 236 in the same terminal slot 240. More specifically, as best illustrated in Fig. 22, it will be noted that when two of the circuit breakers 130 are mounted in side-by-side disposition on the panelboard, they occupy exactly the same space thereon as the single circuit breaker 245. Each of the circuit breakers 130 is provided with a recessed casing portion 244, as best shown in Fig. 14 for engagement by a mechanical retaining element 238, as in said latter application. In addition, in order to provide for the engagement of the stab terminals 158 in the terminal slot 240, regardless of whether an individual circuit breaker 130 is positioned to abut the right or the left side of its companion circuit breaker 130, viewing Fig. 22, and thus to provide the complete interchangeability of the circuit breakers 130 in either the right or left hand disposition, in each pair in position between a retaining element 238 and its companion aligned and paired terminal slot 240, the stab terminals 158 may be rotated within the companion casings, whereby the contact end 210 of each stab terminal may be displaced by 180 degrees. More specifically, and referring now to Figs. 9 and 23, the loop end contact portions 210 of a companion pair of circuit breakers 130 are illustrated in disposition thereof for engagement in the same terminal slot 240. However, it will be noted that each terminal 158 of the pair is displaced in its own casing by 180 degrees from the position of the other terminal in the casing of the latter. This is clearly apparent from Fig. 9. Assuming now that it is desired to dispose the terminal member 158, in the left hand circuit breaker indicated by L, in the same position as the terminal member 158 in the right hand circuit breaker, indicated by R, it is only necessary to grasp the loop 210 of the terminal member in breaker L and urge the terminal member upwardly until the tabs 214—214 thereof clear the groove or seat 222, the spring 224 being compressed during said upward movement of the terminal member. The terminal member is then rotated 180 degrees to the left, viewing Fig. 9, until the tabs are again aligned with the recess 222 whereupon the compressed spring 224 is permitted to expand so that the tabs will abut the shoulders 220 and the terminal member will be disposed, as in the right hand circuit breaker R. Similarly, the terminal member in the right hand circuit breaker R may be disposed, as is the terminal member indicated in the left hand circuit breaker L, in exactly the same manner except that the terminal member in the breaker R will be rotated 180 degrees in a right hand direction. Therefore, it will be readily apparent that the various circuit breakers 130 are completely interchangeable and each may be positioned as required, whether as a left hand or a right hand circuit breaker when paired with a companion circuit breaker 130 on the panelboard 230 so that the pair of circuit breakers may be connected to the same slot 240, as in Fig. 23. It will be noted from Fig. 10, that the previously mentioned chamber 218 is shaped as at 246 and 248 to facilitate the rotation of the end 212 of the stab terminal member and to provide for the disposition of the flexible conductor 156 either in the left hand or right hand position of the stab terminal.

Referring now to Figs. 17–21 in detail, there is illustrated an additional embodiment of the present invention which is substantially similar in all respects, except for the stab terminal thereof, with the previously described circuit breaker 130, identical parts being identified by the same reference numeral. The circuit breaker 250 of the present embodiment is also provided with a movable stab terminal 252 which serves the same purpose as the stab terminal 158. However, instead of being mounted for rotation within its companion casing, as in the case of the stab terminal 158, the stab terminal 252 is mounted for lateral movement transversely of the plane of its companion casing. More specifically, the stab terminal 252 is formed of a strip of resilient conducting material which is bent upon itself to provide the mounting loop 254 at the upper end thereof and the prong contact elements 256 at the lower end thereof. The companion casing parts 132A and 134A are provided with the confronting portions 258 on which the loop 254 is mounted for pivotal movement, as best illustrated in Fig. 19. In order to provide for the lateral movement of the stab 252, laterally or transversely of its companion casing, the latter is provided with an open ended recess or chamber 260 as in Fig. 19. It will be noted that the portion of the casing underlying the stab is beveled, as at 262, to facilitate the lateral movement of the stab and is also provided with a projection or boss 264 on said beveled portion. The portion of the casing which overlies the stab, in opposition to said bevelled portion, is provided with a projection or boss 266. From the foregoing, it will be apparent that in order to adjust the position of the stab 252 from the disposition thereof in the left hand breaker L, viewing Fig. 19 to a position similar to that of the stab 252 in the right hand breaker R in said figure, it is only necessary to grasp the pronged ends 256, below the insulated sleeve 229, and move them to the left, viewing Figure 19, to snap over the boss 264 and against the beveled portion 262, the boss 266 serving to urge the stab in position against the beveled edge 262 thereof. In the same manner, the stab 252 in the right hand breaker R, viewing Fig. 19, may be moved to the other position thereof by merely moving the pronged ends 256 thereof to the right. In this manner, as illustrated in Figs. 22 and 24, a pair of the breakers 250 may be mounted in side-by-side disposition on the panelboard 230, both engaged at one end by a common mechanical securing element 238 which is engaged in the casing recess 244, and mechanically locked and electrically engaged at the stab ends thereof in a common terminal slot 240. Therefore, it will be apparent that the breakers 250 are also interchangeable for mounting on the panelboard 230, in the same manner as the breakers 130.

Figure 17:
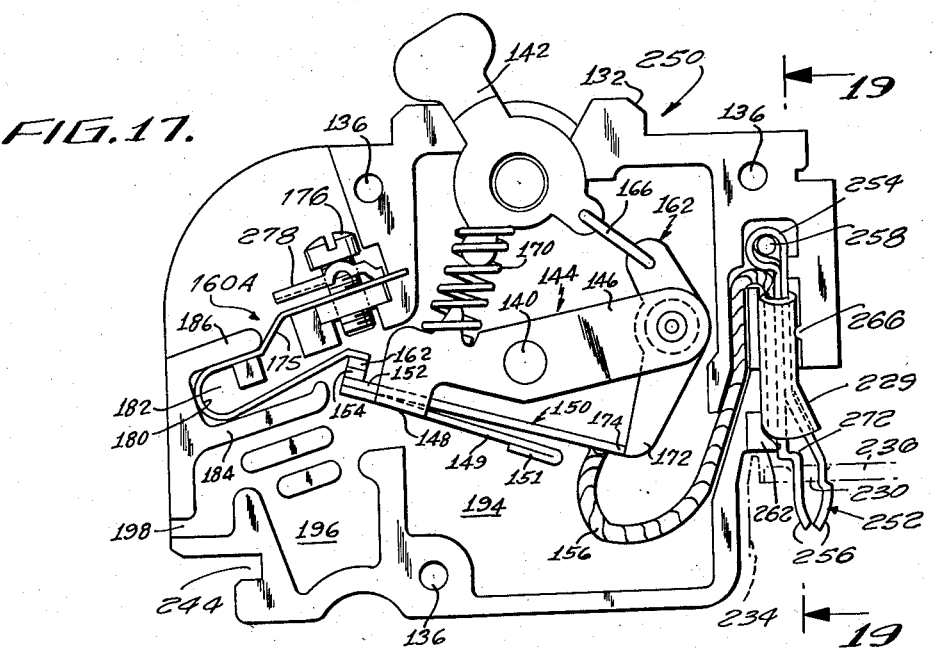
Figs. 17 and 18 are views similar to Figs. 6 and 7, respectively, and illustrate another embodiment of the present invention.
Figure 18:
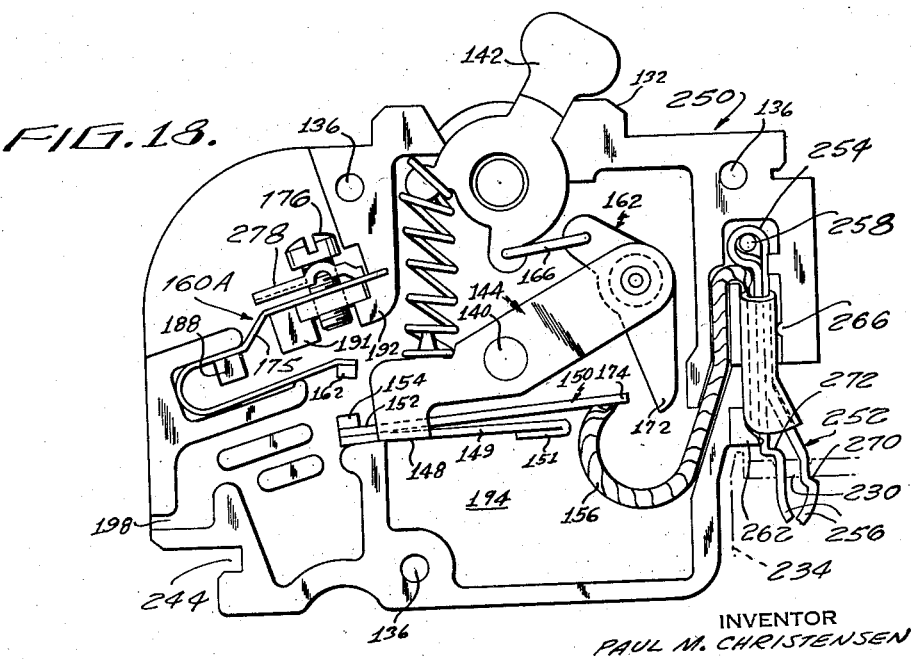

As previously indicated, the stab 252 is formed of resilient material and it will be noted that the prongs 256 thereof are provided with the offsets 270 and 272 which serve to resiliently lock the prongs 256 in the terminal slot 230, as illustrated in Figs. 17 and 18, it being understood that the prongs 256 are forced together upon insertion in the slot 230, so that they resiliently press against opposite edges of the slot to effect said mechanical locking action as well as to provide a good electrical contact. In the same manner, it will be noted from Figs. 6 and 7 that the looped end 210 of the stab terminal 158 of the circuit breaker 130 is also provided with the offsets 274 which serve to mechanically lock the looped end in a slot 230, it being understood that said loop is compressed upon insertion thereof into the slot whereby to provide for both a firm mechanical and good electrical connection thereof in the slot.

It will be noted from Figs. 17 and 18 that the stationary contact terminal 160A in the breaker 250 is substantially the same as the stationary contact terminal 160 in the breaker 130 and is mounted in substantially the same manner and, in addition, provides for resilient contact pressure. However, it will be noted that the terminal 160A is provided with an additional element 278 through which the screw 176 extends and which, together with the underlying portion of the spring 175 constitutes a wire clamp for connecting the load wire to the breaker.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent is:

1. In an automatic circuit breaker provided with relatively movable contacts, a relatively wide and thin elongated flexible circuit controlling member having a portion provided with one of said contacts on a wide face thereof, a movable carrier provided with comparatively rigid electro-magnetic means energized by current flow through said flexible member for flexing the latter, said flexible member being secured to said movable carrier adjacent said one contact and one said movable carrier having rigid means engaging the wide face of said flexible member portion on the face thereof opposite that which is provided with said one contact to provide a rigid backing and mechanical support for said one contact.

2. In an automatic circuit breaker provided with relatively movable contacts, a relatively wide and thin elongated flexible circuit controlling member having a portion provided with one of said contacts on a wide face thereof, a movable carrier provided with comparatively rigid electro-magnetic means energized by current flow through said flexible member for flexing the latter, said flexible member being secured to said movable carrier adjacent said one contact and one said movable carrier having rigid means engaging the wide face of said flexible member portion on the face thereof opposite that which is provided with said one contact to provide a rigid backing and mechanical support for said one contact, said electromagnetic means being integral with said carrier.

3. In an automatic circuit breaker provided with relatively movable contacts, a relatively wide and thin elongated flexible circuit controlling member having a portion provided with one of said contacts on a wide face thereof, a movable carrier provided with comparatively rigid electro-magnetic means energized by current flow through said flexible member for flexing the latter, said flexible member being secured to said movable carrier adjacent said one contact and one said movable carrier having rigid means engaging the wide face of said flexible member portion on the face thereof opposite that which is provided with said one contact to provide a rigid backing and mechanical support for said one contact, said electro-magnetic means being secured to said carrier and said predetermined portion extending therefrom.

4. In an automatic circuit breaker provided with relatively movable contacts, a relatively wide and thin elongated flexible circuit controlling member having a portion provided with one of said contacts on a wide face thereof, a movable carrier provided with comparatively rigid electro-magnetic means energized by current flow through said flexible member for flexing the latter, said flexible member being secured to said movable carrier adjacent said one contact and one said movable carrier having rigid means engaging the wide face of said flexible member portion on the face thereof opposite that which is provided with said one contact to provide a rigid backing and mechanical support for said one contact, manually operable actuating means releasably connected to said flexible member and operatively connected thereby to said carrier, said electro-magnetic means having a portion of increased thickness spaced from said predetermined portion for increasing the magnetic flux operable upon said releasable connection.

5. A circuit breaker having a casing, circuit breaker mechanism disposed in said casing, said mechanism including relatively movable companion contacts engageable with and disengageable from each other, a resilient mounting for one of said contacts, said mounting comprising a spring member having a fulcrum portion and opposite end portions one of which is provided with said one contact, and said casing having wall portions which define a seat for said fulcrum portion, said one end portion extending outwardly of said seat and being free to flex relative to said fulcrum portion and said casing providing a limit stop preventing said one contact from moving with the companion contact beyond a predetermined point when said companion contact is operated in the contact-opening direction by said circuit breaker mechanism.

6. A circuit breaker having a casing, circuit breaker mechanism disposed in said casing, said mechanism including relatively movable companion contacts engageable with and disengageable from each other, a resilient mounting for one of said contacts, said mounting comprising a spring member having a fulcrum portion and opposite end portions one of which is provided with said one contact, and said casing having wall portions which define a seat for said fulcrum portion, said one end portion extending outwardly of said seat and being free to flex relative to said fulcrum portion, said other end portion having wire attaching means, and said casing having wall portions for rigidly mounting said other end portion in position.

7. A circuit breaker having relatively movable companion contacts engageable with and disengageable from each other, movable carrier means for one of said contacts, said carrier means having laterally spaced terminal portions adjacent said contacts in the engaged condition thereof and at opposite sides thereof, and current conducting means in circuit with said one contact and extending between said spaced portions, said portions being formed of magnetizeable material which is energized by current flow through said conducting means to constitute arc blow-out means.

8. A circuit breaker having relatively movable companion contacts engageable with and disengageable from each other, movable carrier means for one of said contacts, said carrier means having laterally spaced terminal portions adjacent said contacts in the engaged condition thereof and at opposite sides thereof, and current conducting means in circuit with said one contact and extending between said spaced portions, said portions being formed of magnetizeable material which is energized by current flow through said conducting means to constitute arc blow-out means, said current conducting means being a flexible thermally responsive element, and actuator means mounted between said spaced portions and releasably latched to said element for operating said carrier means to manually engage and disengage said contacts.

9. A circuit breaker having relatively movable companion contacts engageable with and disengageable from each other, movable carrier means for one of said contacts, said carrier means having laterally spaced terminal portions adjacent said contacts in the engaged condition thereof and at opposite sides thereof, and current conducting means in a circuit with said one contact and extending between said spaced portions, said portions being formed of magnetizeable material which is energized by current flow through said conducting means to constitute arc blow-out means, said current conducting means being a flexible thermally responsive element, and actuator means mounted between said spaced portions and releasably latched to said element for operating said carrier means to manually engage and disengage said contacts, said carrier means including comparatively rigid armature means mounting said thermal element for relative movement and energized by current flow through said element for flexing the latter to unlatch said actuator means.

10. In an automatic circuit breaker, a stationary contact means and a companion movable contact means, a movable member operable to effect the engagement and disengagement of said contact means, manual actuating means, and current-responsive control means operable to latch said movable member to said actuating means and to unlatch it therefrom in response to predetermined current conditions, said control means comprising a relatively wide and thin elongated flexible thermally responsive element for latching said movable member to said actuating means and comparatively rigid electro-magnetic means energized by current flow through said thermal element for flexing said element to unlatch said movable member, said flexible element being provided on a wide face at one end thereof with said movable contact means, said movable member being provided with said electro-magnetic means, and said electro-magnetic means mounting said flexible element in such manner as to form a rigid backing for said movable contact means to constitute a mechanical support therefor.

11. In an automatic circuit breaker, a stationary contact means and a companion movable contact means, a movable member operable to effect the engagement and disengagement of said contact means, manual actuating means, and current-responsive control means operable to latch said movable member to said actuating means and to unlatch it therefrom in response to predetermined current conditions, said control means comprising a relatively wide and thin elongated flexible thermally responsive element for latching said movable member to said actuating means and comparatively rigid electro-magnetic means energized by current flow through said thermal element for flexing said element to unlatch said movable member, said flexible element being provided on a wide face at one end thereof with said movable contact means, said movable member being provided with said electro-magnetic means, and said electro-magnetic means mounting said flexible element at said movable contact means to form a rigid backing for said movable contact means to constitute a mechanical support therefor.

12. In an automatic circuit breaker, a stationary contact means and a companion movable contact means, a movable member operable to effect the engagement and disengagement of said contact means, manual actuating means, and current-responsive control means operable to latch said movable member to said actuating means and to unlatch it therefrom in response to predetermined current conditions, said control means comprising a relatively wide and thin elongated flexible thermally responsive element for latching said movable member to said actuating means and comparatively rigid electro-magnetic means energized by current flow through said thermal element for flexing said element to unlatch said movable member, said flexible element being provided on a wide face at one end thereof with said movable contact means, said movable member being provided with said electro-magnetic means, and said electro-magnetic means mounting said flexible element at said movable contact means to form a rigid backing for said movable contact means to constitute a mechanical support therefor, said electro-magnetic means being integral with said movable member.

13. In an automatic circuit breaker, a stationary contact means and a companion movable contact means, a movable member operable to effect the engagement and disengagement of said contact means, manual actuating means, and current-responsive control means operable to latch said movable member to said actuating means and to unlatch it therefrom in response to predetermined current conditions, said control means comprising a relatively wide and thin elongated flexible thermally responsive element for latching said movable member to said actuating means and comparatively rigid electro-magnetic means energized by current flow through said thermal element for flexing said element to unlatch said movable member, said flexible element being provided on a wide face at one end thereof with said movable contact means, said movable member being provided with said electro-magnetic means, and said electro-magnetic means mounting said flexible element at said movable contact means to form a rigid backing for said movable contact means to constitute a mechanical support therefor, said electro-magnetic means being secured to said movable member and having a portion extending therefrom to which said thermal element is secured.

14. A circuit breaker including confronting companion casing walls, circuit breaker mechanism disposed between said casing walls, said mechanism including a resiliently mounted contact and an operated contact movable into and out of engagement with said resiliently mounted contact, an external terminal connected to said resiliently mounted contact and resilient means biasing said resiliently mounted contact away from said external terminal and toward said operated contact, at least one of said walls embodying projecting portions defining a slot laterally receiving and fixedly positioning said external terminal and at least one of said walls embodying a projecting portion limiting the distance of travel of said resiliently mounted contact away from said external terminal when said operated contact is moved away from said resiliently mounted contact.

15. A circuit breaker including confronting companion casing walls, circuit breaker mechanism disposed between said confronting casing walls, said mechanism including a resiliently mounted contact and an operated contact movable into and out of engagement with said resiliently mounted contact, an external terminal, a conductive U-shaped leaf spring extending from said terminal at one end thereof and mounting said resiliently mounted contact at the other end thereof and biasing the thus mounted contact away from said external terminal and toward said operated contact, at least one of said walls embodying projecting portions defining a slot laterally receiving and fixedly positioning said one end of said U-shaped leaf spring and at least one of said walls embodying a projecting portion limiting the travel of said resiliently mounted contact away from said external terminal when said operated contact is moved away from said resiliently mounted contact.

References Cited in the file of this patent
UNITED STATES PATENTS

| Number | Name | Date |
|---|---|---|
| 1,319,915 | Tregoning | Oct. 28, 1919 |
| 1,498,146 | Benjamin | June 17, 1924 |
| 2,203,462 | Frank | June 4, 1940 |
| 2,254,067 | Frank | Aug. 26, 1941 |
| 2,281,950 | Rypinski | May 5, 1942 |
| 2,320,437 | Jennings | June 1, 1943 |
| 2,492,382 | Ingwersen | Dec. 27, 1949 |
| 2,568,423 | Walker et al. | Sept. 18, 1951 |
| 2,573,307 | Casey | Oct. 30, 1951 |
| 2,588,497 | Dorfman et al. | Mar. 11, 1952 |
| 2,647,186 | T. M. Cole | July 28, 1953 |
| 2,661,414 | Casey | Dec. 1, 1953 |
| 2,681,396 | Cole et al. | June 15, 1954 |
| 2,689,285 | Drobney et al. | Sept. 14, 1954 |
| 2,696,540 | Christensen | Dec. 7, 1954 |
| 2,704,315 | Norden | Mar. 15, 1955 |
| 2,786,113 | Norden | Mar. 19, 1957 |